Sept. 30, 1969        H. R. BIERMAN        3,469,578

INFUSION DEVICE FOR AMBULATORY PATIENTS WITH FLOW CONTROL MEANS

Filed Oct. 12, 1965        2 Sheets-Sheet 1

INVENTOR.
HOWARD R. BIERMAN

BY HIS ATTORNEYS.
HARRIS, KIECH, RUSSELL & KERN

United States Patent Office 3,469,578
Patented Sept. 30, 1969

3,469,578
INFUSION DEVICE FOR AMBULATORY PATIENTS
WITH FLOW CONTROL MEANS
Howard R. Bierman, 300 Hilgard Ave.,
Westwood, Calif. 96137
Filed Oct. 12, 1965, Ser. No. 495,074
Int. Cl. A61m 37/00; B65d 35/28
U.S. Cl. 128—214
20 Claims

ABSTRACT OF THE DISCLOSURE

A device for expelling a liquid at an extremely slow rate over a period ranging from several hours to days with the liquid being expelled from a distended relatively-thick-walled elastic bladder member solely by pressure induced on the liquid by the internal stresses of the distended bladder member. The device is comprised of an outer rigid housing having a thick-walled elastic bladder therein which dispenses liquid therefrom through a flow controlled outlet means attached to the outer housing. A porous-type flow-control means in the outlet means prolongs the flow and controls the flow rate. The device is particularly useful in administering parenteral infusions to ambulatory patients over a predetermined period of time at a controlled flow rate.

---

My invention relates to a small device for expelling a stored liquid at an extremely slow but substantially constant rate with the expulsion continuing over a large number of hours.

More particularly, a primary embodiment of the invention comprises a device for the ambulatory infusion of a medicament into the body with the infusion continuing at an extremely low rate over a number of hours that will usually range from about eight hours up to about five days or more or that may sometimes range from a minimum of about four hours up to several days, all while the patient remains ambulatory if such condition is otherwise medically feasible.

There are many instances in which medicaments are desirably introduced to the body in minute quantities over a prolonged period of time. For example, my research has shown that arterial therapy of neoplasms by infusion of suitable medicaments is beneficial and that the slow generation time and prolonged life span of the cells in the leukemias and in neoplasms in general makes desirable continuous and prolonged infusion for optimum benefits. In this and many other instances it has been found that such prolonged and incremental medication gives results far superior to periodic injections that may be dangerous to normal cells or tissue because of the high concentration of the medicament at infusion times. At best, periodic injections provide intermittent action with periods of excess and deficient medication.

In the medical field, slow and prolonged infusion is desirable in many other instances. For example, minerals, proteins, vitamins, amino acids, heparin, etc. can be infused into humans or animals for purpose of nutrition, prevention of muscular dystrophy, increase (or decrease) of normal biological functions (e.g. fertility, weight or height control), etc. The slow infusion of medicaments is desirable in the treatment of human and veterinary diseases such as cancer, leukemia, lymphomas, infectious or contagious diseases (e.g. bacterial virus or fungal), metabolic disorders (e.g. diabetes), etc. In general, the invention finds wide use in investigation, diagnosis and treatment of disease both animal and human and in the biologic sciences (e.g. in biochemistry, physiology, pharmacology, etc.). It may also be used in preventive medicine for animal or human immunization, public health, and prophylactic programs.

Many of the terms herein are used in a broad sense. For example, when referring to infusion I have reference to parenteral, oral or absorptive transfer of liquids into the body. Arterial infusion will be exemplified but other types of infusion are contemplated either by direct delivery to a selected area of the skin or through a scarified area of the skin covered by a small cup. In referring to the body I have reference to the torso or extremities of humans or animals. When referring to medicaments I have reference not only to drugs but also to more benign liquids such as saline solutions, solutions for intravenous feeding or solutions having biological or other effects.

Previous attempts toward prolonged infusion have usually involved gravity-flow methods and have usually required bed confinement of the patient and periodic checking or monitoring by the nurse or doctor to be sure that the gravity-induced flow is continuing at a proper rate. The problem is complicated by the fact that the pressure head changes with change in the amount of liquid in the elevated reservoir; also by the fact that any change in bed position of the patient that changes the elevation of the infusion point relative to the reservoir will change the infusion rate. There has been no satisfactory way of actually measuring the slow flow rates involved. In this latter connection measurement by a drop-counting technique is both tedious and unsatisfactory and exposes the medicament to contact with the air in which the drops form. Often the desired flow rate may be in the range of one drop in about 4–12 minutes up to 40 drops per minute, making determinations inaccurate and corrections thereof tedious and time-consuming. It is an object of the invention to provide a self-monitoring system for the slow expulsion of medicaments or other liquids—a system that can be pressured and set into operation with assurance that the flow will continue at the desired slow rate irrespective of movement that might otherwise change the discharge rate.

There is need for a small light-weight device that can be fixed to the body near an infusion position and that will silently and reliably deliver the medicament to the patient at an extremely slow rate over a large number of hours. Its pressure source should develop a substantially constant pressure throughout the infusion period and should be protected against generation of abnormal pressures through any act or movement of the patient. The device should be such that a precharged pressure device can be employed or such that the doctor can introduce into the device the desired quantity of medicament under pressure, expell all air from the system and rely on the device to deliver the charged medicament to the patient through an infusion means in a desired number of hours or days. The device should be such that it will continue reliable operation even though the patient is ambulatory— a device that can be secured to the body beneath the clothing without restriction of motion of the patient. Often it is desirable that the device be of a single-use disposable nature. It should of course be capable of sterilization. It is an object of the present invention to provide an ambulatory infusion device having some or all of the above characteristics.

For ambulatory parenteral infusion the pressure source should develop a pressure slightly higher than arterial pressure, the latter being usually in the neighborhood of 160 mm. of mercury. A pressure source containing about 5 to 1,000 ml. of medicament and producing a pressure in the range of about 160–200 mm. of mercury or even up to 300 mm. of mercury in some uses is desirable although sources of higher or lower cubical content producing pressures above 300 mm. of mercury can be employed for some purposes. It is the object of the invention to provide a compact light-weight pressure source of this nature and capacity connected to an infusion or delivery means with the flow rate being controlled by a flow-control means that determines the actual delivery rate. In medicinal uses this flow rate may be from about .1 ml./hr. up to 250 ml./hr. A widely usable infusion rate may be from a fraction of a milliliter per hour, e.g. about .5 ml./hr. or less up to ten or twenty milliliters per hour. Exemplary of typical embodiments, the invention may include a small pressure source of about 10-50 ml. capacity connected to a flow-control means delivering this quantity of liquid uniformly over a 1 to 5 day period or the source may be as large as 1,000 ml. with a flow-control means designed to expell this amount of liquid in a period of four hours to three, four or five days.

The preferred flow-control device of the invention is a porous mass of inert material in the flow path of the liquid, preferably a compressible porous mass of material within a chamber through which the expelled liquid must pass, plus some means for initially compressing the porous mass and maintaining it under compression during use, the porous mass of material under pressure being such as to produce pores of minute size sufficient to restrict the liquid to produce the desired slow flow rate. The preferred flow-control means is a compressed mass of filamentary material, preferably composed of one or more elements, each in turn composed in interwoven filaments. A compressed mass of plastic mesh fabric such as nylon or Dacron mesh material is quite satisfactory. It is an object of the invention to provide a device including means for storing a relatively small volume of liquid under a relatively low pressure and a flow-control means of the type discussed above that acts to restrict the flow to such a slow rate that expulsion from the device continues for a period of many hours or days.

Another object of the invention is to interpose a microflow means in the flow path between the pressure source and a porous flow-control means and/or between the flow-control means and the discharge or infusion means. Such a microflow means may comprise at least one minute passage creating a small but significant pressure drop on the liquid flowing therethrough. If such a microflow means is used ahead of the flow-control means it will somewhat reduce the influent pressure thereto. Such a microflow means serves also as a safety device that will in itself restrict the flow should there be any destruction or malfunction of the main flow-control device. If a microflow means receives the liquid from the flow-control means it acts as a safety device in blocking any reverse flow of blood from the patient should the device be left connected after its pressure is exhausted or if the inlet thereto was accidentally opened. The greater viscosity and clotting action of the blood, as compared with the medicament, prevents such reverse flow. Preferably a microflow means is used both ahead of and beyond the flow-control means. It is an object of the invention to provide such a microflow or safety means ahead of and/or beyond a flow-control means in a device of the character described.

The preferred pressure source is a pressure-distendable bladder member formed of highly elastic material that is immune to the liquid within the bladder member or that is at least lined with such an inert material. The invention includes various bladder members of this type and various means of protecting same against the application of extraneous pressures that might upset the constancy of the flow rate desired. It provides also for the tensioning of the bladder member if this is desired. The invention includes also unique ways of providing for the loading of such a bladder member with the liquid to be later expelled. In this latter connection it is an object of the invention to provide a suitably protected bladder member associated with a multi-way valve adapted to be connected to a source of the desired liquid, the valve being movable from a charging position in which this source is connected to the interior of the bladder member for introduction of liquid and distension of the bladder member, the valve when in another position interconnecting the interior of the bladder member to a delivery means such as an infusion device.

Another object of the invention is to provide for emergency expulsion or delivery of the pressured liquid at a higher rate. For example, it may sometimes be desirable to deliever the liquid temporarily to the patient at a higher rate. This can be done by connecting the delivery or infusion means to the valve inlet line and controlling the flow by moving the valve slowly toward its charging position to restrict the flow of pressured liquid to the desired degree.

Further objects and advantages of the invention will be evident to those skilled in the art from the following description of exemplary embodiments. Such embodiments are exemplified as ambulatory infusion devices but it should be clear that devices of the type shown in the drawing are capable of other uses where liquids are to be expelled at extremely slow rates over a large number of hours or days. Such liquids should always be free of dispersed solids, particularly at the time they reach the flow-control means.

Referring to the drawings:

FIG. 9 is a side elevational view, partially in section, of an alternative embodiment of the invention, while FIGS. 10 and 11 are respectively sectional views thereof taken along the lines 10—10 and 11—11 of FIG. 9;

FIG. 12 is a sectional view of a further alternative embodiment while FIG. 12a is a section thereof taken along the line 12a—12a of FIG. 12;

FIG. 13 is a fragmentary sectional view of a lined bladder member; and

FIGS. 14 to 17 are fragmentary views illustrating the action of one type of lined bladder member during distension and collapse thereof.

Referring particularly to FIGS. 1-4 there is shown an outer shell 15 providing an internal space 16 therewithin with a hollow neck 17 (FIG. 3) opening on such space. A distendable bladder member 20, made of highly elastic material, provides a neck portion 21 surrounding the hollow neck 17. The bladder member has a single opening within the neck portion 21 through which liquid may be introduced into and discharged from the bladder member 20 by flow through a passage 23 as will be described.

Figures 1, 3, 4, 5, 6, 7, 8:
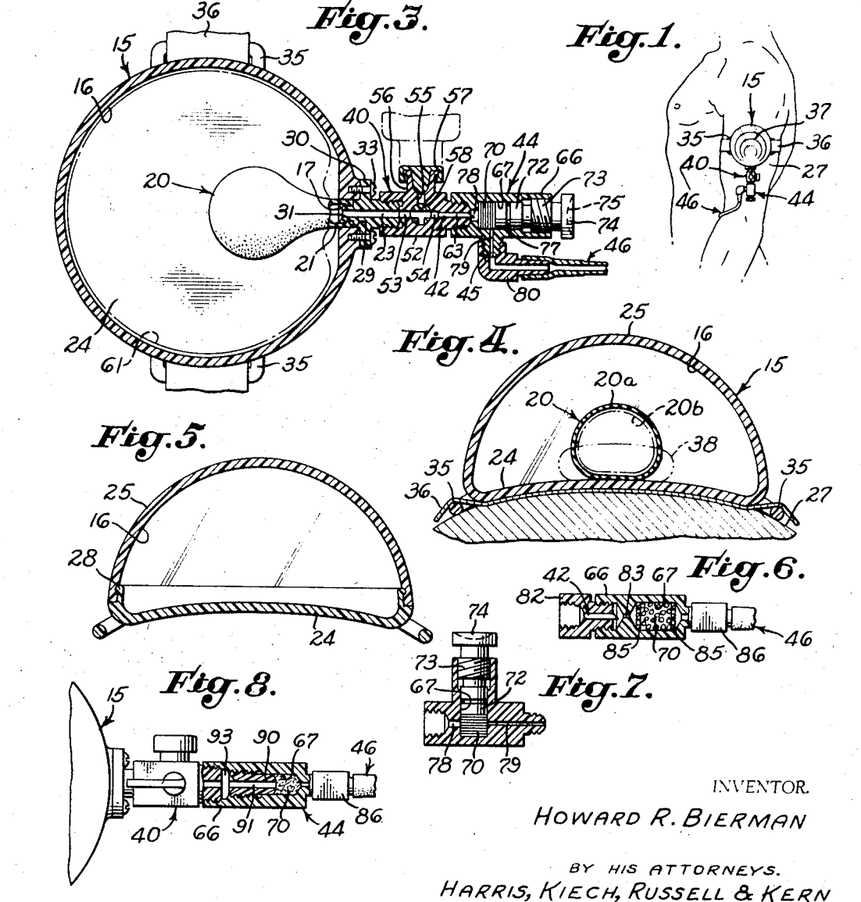
FIG. 1 is a side elevational view, partially in section, of an embodiment of the invention attached to the arm of a patient.
FIGS. 3 and 4 are respectively sectional views taken along the lines 3—3 and 4—4 of FIG. 2.
FIG. 5 is a sectional view similar to FIG. 4 showing an alternative construction for the outer shell of the device.
FIGS. 6, 7 and 8 are fragmentary sectional views showing alternative flow-control means and related equipment.
Figure 2:
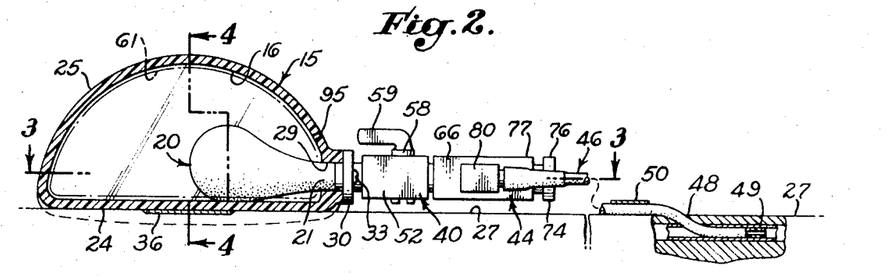
FIG. 2 is a side elevational view of the device, partially in section.

The outer shell 15 may be of a shape that is substantially spherical, semispherical or elongated. In the preferred embodiment the outer shell is made of a rigid form-retaining material, preferably a transparent material such as polystyrene or polypropylene. Its shape is preferably such as to provide a lower wall 24 adapted to engage the body and a crested upper wall connected at its lower portions to such lower wall. The lower wall 24 is preferably shaped to conform to a curve of the body, being shown as a downwardly-concave wall adapted to engage an arm, or extremity or rounded torso 27 of the patient. In FIGS. 2-4 the upper wall 25 is substantially hemispherical in shape.

The crested upper wall 25 and the lower wall 24 may be formed as separate elements, as suggested in FIG. 5, in which case they can be locked by adhesion or by a bead 28 of the lower wall snapping into a corresponding groove of the upper wall. Preferably, however, the upper and lower walls are integral, as suggested in FIGS. 2–4, the main portion of the outer shell being blow-molded or otherwise formed and a circular passage 29 being provided. The hollow neck 17 can then be formed as a part of an attachment member 30.

The outer portion of the hollow neck 17 may fit the circular passage 29 and the inner portion of the neck made smaller and provided with a groove receiving a circular bead 31 extending inward of the neck portion 21 of the bladder member 20. In this event the outer diameter of the neck portion 21 may be the same as the diameter of the circular passage 29 and the bead 31 will lock the bladder member to the attachment member 30 against displacement when the bladder member is internally pressured. The uninflated bladder member 20 may be attached to the attachment member 30 and worked through the circular passage 29. The attachment member 30 may be connected to the main portion of the outer shell 15 by screws 33 or it may be permanently adhered or bonded thereto once the bladder member 20 is in place. The latter procedure is particularly desirable in single-use throw-away devices. In the embodiment of FIG. 5 the bladder member can be connected to a neck, like the hollow neck 17, extending into the internal space 16, this being done before the upper wall 25 is snapped onto the lower wall 24.

Means is provided for attaching the outer shell 15 to a portion of the body near a desired infusion position. This may be accomplished by attachment loops 35 molded integrally with or adhered to the outer shell 15. A strap 36 may extend through the attachment loops 35 below the lower wall 24 in contact with the skin. This strap may be of a length to surround the extremity or it may be secured thereto by strips of adhesive tape. The later is particularly desirable when the device is to be attached to the torso.

The bladder member 20 should comprise or be made of a highly elastic material, such as rubber or elastic plastic, that will return to substantially its initial form when the bladder member is distended and subsequently contracted. The bladder member should be of an initial form and dimension much smaller than the internal space 16. With the balloon-type bladder member of FIGS. 2–4 its initial length will ordinarily be half or less the distance between the neck portion 21 and the opposed wall of the outer shell. Its height, as viewed in FIG. 2, will initially be half or less the height of the internal space 16. Such a bladder member can distend both lengthwise and laterally when internally pressured. Index means such as index rings or markings 37 of FIG. 1 can be imprinted on or molded in the crested upper wall 25 of the outer shell. These can be calibrated in fractions or volume and when viewed with the bladder member as a background will show the degree to which the bladder member is then filled, thus giving an indication of the time remaining during which infusion will continue.

For the most exacting results the bladder member can be designed to be of a shape and wall thickness to expand into a form generally corresponding to the internal contour of the space 16 before any significant portion thereof comes into pressural contact with the inner wall of the outer shell. Designs of this type are disclosed in the U.S. Patent Re. 23,437. The bladder member 20 should preferably have a definite initial shape but in this initial shape it need not have any external surface in engagement with the inner wall of the outer shell 15. FIGS. 2 and 4 show a less exacting form of the invention in which the bladder member 20 provides a lower portion that is initially in light engagement with the lower wall 24. Any slippage therebetween during distension or contraction of the bladder member will not significantly change the desired operation. Instead the bladder member 20 may be initially of a flattened configuration, as suggested by the dotted lines 38 of FIG. 4, to distend more uniformly into the shape of the inner wall of the outer shell 15.

Figures 12, 12A, 13, 14, 15, 16, 17:
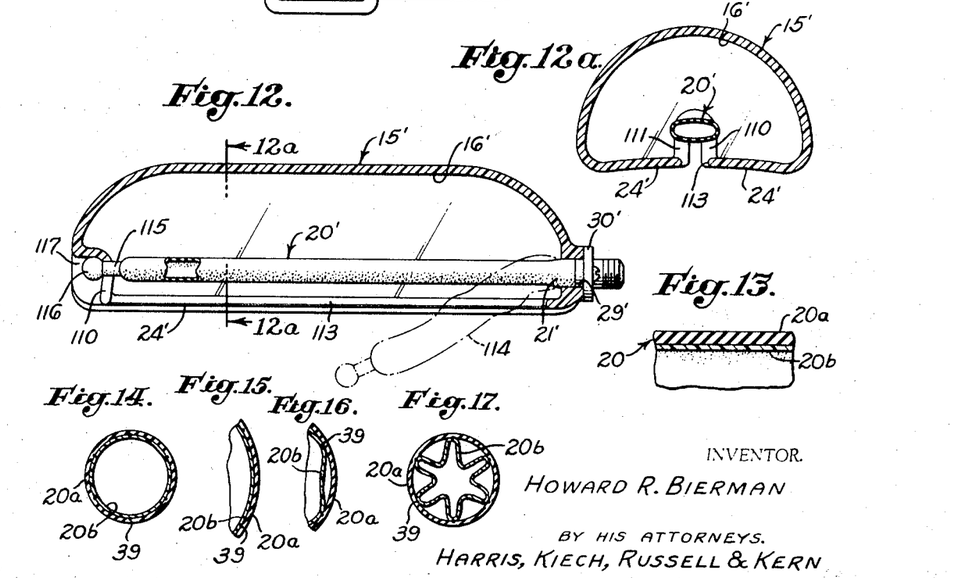

It is often advantageous to employ a two-piece bladder member, including an outer member 20a of highly elastic material, such as rubber, and an inner liner 20b formed of distendable plastic and conforming initially in shape to the inner wall of the outer member 20a, see FIGS. 4, 13 and 14. The thickness of the liner 20b should be much less than the outer member 20a and is exaggerated in the drawings for purpose of clarity.

Further advantages arise from use of an inner liner 20b made of plastic that is distendable but substantially nonelastic in the sense of not being able to return to its initial form once it has been severely distended. The liner will then distend with the outer member 20a when liquid is forced into the bladder member under pressure but will not equally contract with the outer member as the liquid is slowly expelled and the outer member collapses to its initial state.

Such a liner will occupy only a very small percentage of the internal volume of the outer member 20a when the latter is in its initial shape. However the inner liner will occupy a greater percentage of the volume of the outer member upon collapse of the latter to its initial shape, thereby expelling from the bladder member a greater volume of the liquid than is represented by the change in volume of the outer member 20a in collapsing from its distended shape to its collapsed or initial shape. This aids in minimizing the amount of residual liquid in the bladder member upon collapse to a state in which no usable pressure is developed. The increased percentage of the internal volume of the outer member 20a occupied by a liner made of a material that is distendable but substantially nonelastic is the result of an action that can be explained as follows. While the mass of the liner 20b remains the same before and after the bladder member is distended and contracted, the volume occupied thereby will usually be greater once distension has occurred. For example, if the liner is not equally elastic with the outer member 20a it will tend to fold or become crimped, ridged or generally wrinkled during collapse of the outer member, with its ridged, wrinkled or crimped portions compositely occupying a greater percentage of the volume of the outer member. Indeed the liner 20b can be locally bonded to the outer member 20a at points or lines to induce or control such wrinkling or crimping upon contraction of the outer member.

These principles are suggested diagrammatically in FIGS. 14–17. If in FIG. 14 the liner 20b is adhered to the outer member 20a in its initial shape at spots 39 or along lines through such spots the two members will distend equally (FIG. 15) but as contraction of the member 20a later takes place the liner 20b may start to wrinkle or fold (FIG. 16) with the folding action continuing until the outer member 20a reaches its previous or initial form (FIG. 17). In this latter state (FIG. 17) the residual volume within the liner 20b is much less than the volume was initially (FIG. 14). It should be understood that the wrinkling or folding of the liner upon collapse of the outer member 20a need not be in any regular pattern and is shown only diagrammatically in FIGS. 16 and 17. A somewhat regular pattern, usually less regular than that suggested in FIG. 17, will result if the members 20a and 20b are initially adhered along spaced lines or at spaced points represented by the spots 39.

For ambulatory infusion the invention is exemplified as providing generally a multi-way valve 40 controlling the charging and discharging of the bladder member 20; an upstream microflow means 42; a flow-control means 44; a downstream microflow means 45; and a discharge means 46. The latter conducts into the body liquid expelled by the contraction of the bladder member 20, the rate of flow being controlled by the action of the microflow means 42, 45 and the flow-control means 44.

The discharge means 46 may comprise an infusion means having one end portion connected to the flow-control means 44 and an infusion end portion adapted for insertion into the body at an infusion position 48 (FIG. 2). The infusion means may be a simple rubber tube or catheter with an infusion end portion inserted through the skin and into an artery 49, sometimes following an arterial path to a remote position in the body to discharge the medicament in the locale of the infection. In some instances such a tube can be inserted through body openings, e.g. openings of the nose into the stomach or directly into the gastro-intestinal tract. In other instances the infusion end portion may constitute a hypodermic needle or other element that is inserted through the skin into an artery, vein, organ or body tissue. In other instances the infusion end portion may constitute a cup-like member covering a scarified area of the skin for absorptive transfer of the liquid into the body. A strip of adhesive tape 50 or other means can be employed to hold the discharge means to the body near the infusion end portion.

The multi-way valve 40 provides a housing 52 that may be threaded to the attachment member 30 or be integral therewith. As shown, the housing 52 includes a first housing passage 53 opening to the interior of the bladder member 20 through the passage 23, a second housing passage 54 constituting a discharge passage communicating with the discharge means 46 through the flow-control means 44, and a third housing passage 55 constituting a charging passage or inlet means adapted for connection to a source of liquid under pressure. The passage 55 may be within a side neck 56 that may be flanged and/or internally threaded to receive the male fitting of a syringe or other pressure source, suggested by the dotted lines. Any means for detachably connecting such a syringe or other pressure source to the housing 52 or to the interior of the bladder member 20 are contemplated and fall within the scope of the invention. When the pressure source is not connected to the side neck 56 the latter may be closed by a removable cap 57.

All of the passages 53–55 open on a central valve chamber containing a rotary valve member 58 connected to an operating means shown in FIG. 2 as a handle 59 serving an indexing function by pointing in the direction of the flow desired. The valve member 58 is of conventional form and provides passage means including a through-passage and a side passage controlling the flow in several ways, depending upon the position of the valve member. When in one position, namely the discharge position shown in FIG. 3, the through-passage interconnects the first and second housing passages 53 and 54 so that contraction of the bladder member 20 expells liquid to the discharge means 46. When in this position the handle 59 preferably extends toward the outer shell 15 to lie in a position protected by such outer shell against accidental lateral movement resulting from unintentional contact or entanglement with any covering garment of the patient. When the valve member 58 is in a second or intake position, swung clockwise 90° from the position of FIG. 3, the through-passage and the slide passage will interconnect the first and third housing passages 53 and 55. The handle 59 will then point toward the side neck 56 and a pressure source connected thereto will force liquid through the valve into the bladder member 20 to charge and distend it within the outer shell 15 to a position indicated by dotted lines 61 of FIGS. 2 and 3. If the valve member is turned this position with the bladder member charged and the pressure source disconnected the housing passage 55 can be flushed and some of the liquid expelled from the bladder. If at this time the inlet portion of the discharge means 46 is connected to the side neck 56 through a suitable fitting an emergency or fast-rate dosage can be injected into the patient with the flow rate determined by the incremental turning of the valve member toward the above-mentioned position. If the valve member 58 is turned counterclockwise 90° from its FIG. 3 position the side passage and a portion of the through-passage interconnect the second and third housing passages 54 and 55. This position may be used as a test position or for bleeding liquid from the flow-control means 44. At an intermediate position the valve member 58 blocks all of the housing passages 53, 54 and 55.

The microflow means 42 may comprise any means for inducing a small but measurable pressure drop on the discharging liquid before it is delivered to the flow-control means 44, thus reducing the influent pressure on the latter. The microflow means usually comprises at least one minute passage, exemplified as a passage of a hypodermic needle 63 associated with the multi-way valve 40. If desired the housing 52 of the latter may be molded of plastic and the needle 63 embedded therein during molding thereof. As shown, the needle 63 protrudes minutely from a neck of the housing 52. The flow-control means 44 is preferably detachably connected to such a neck, as by being threaded thereto. Here, as with all of the other threaded connections shown or mentioned, conventional Luer fittings may be employed.

The flow-control means 44 is shown as including a housing 66 providing a chamber 67 in which is a porous mass of material 70 through which the discharging liquid must flow to reach the delivery means 46. The porous mass 70 may be of any known flow-impeding material through which a liquid free of solids can ooze at the relatively low pressures imposed on the liquid by the invention. Many advantages result from the use of a compressed mass of material that is initially compressed to produce the desired pore size and flow rate and maintained in such compressed state during use in the invention. I prefer to use a compressed mass of filamentary material with the filaments matted or interwoven to be in fabric form. The preferred fabric comprises interwoven filaments of Dacron, nylon or other plastic that is non-wettable and non-absorbable as concerns the liquid passing therethrough, preferably of a type capable of withstanding autoclaving temperatures for sterilization and of course nonreactive with the medicament being infused. A single fabric element can be wrinkled or folded into the chamber 67 and placed in compression therein or a series of fabric discs can be disposed face-to-face in the chamber and pressed or compacted together. A material known as Millipore can sometimes be used to advantage in wrinkled or disc form. Compaction of any of the described porous masses reduces the pores to minute or micropore size. A pore size is used that is sufficiently small to restrict the rate of flow and the collapse of the bladder member to prolong both actions for a number of hours or even days.

In the embodiment of FIG. 3 the pore size and the flow rate is adjustable by the attending physician. This is accomplished by the use of a piston 72 having a steep-threaded portion 73 within a correspondingly threaded socket of the housing 66, the piston having a protruding adjustment member 74 providing a slot 75 for receipt of a screw driver, coin or other blade to effect turning of the piston and adjustment of the compression of the porous mass. In the preferred arrangement the adjustment member 74 is indexed relative to the housing 66 to indicate the flow rate at different positions. This may be accomplished by making the housing 66 a four-sided body and the adjustment member 74 a four-sided head. When each flat 76 (FIG. 2) of such a head is brought into alignment with a corresponding flat 77 of the housing 66 the flow-control means will be set to meter a corresponding flow of the liquid into the discharge means 46. By way of example, each of the four positions of such an adjustment member 74 can correspond to a compaction of the porous mass 70 that will deliver liquid at the following rates in ml./hr., namely 0.5, 1.0, 1.5, and 2.0 for a 50 ml. embodiment of the invention or in steps from 40 to 200 ml./hr. for a 500 ml. or a 1,000 ml. device. The appropriate values of flow rate can be indicated on the four sides of the housing 66 and the slot 75 indexed to point toward one of the four sides.

The inner end of the piston 72 may turn in contact with the porous mass 70 or may provide a rotatable head engaging the mass without turning. A sealing means such as an O-ring 77 may be employed. Influent liquid from the needle 63 may enter an intake space 78 of the body 66. Metered liquid from the chamber 67 may flow through a side fitting containing a passage 79 that may be small enough in diameter to act as a second microflow means functioning largely as a safety device but which may, like the microflow means 42 previously described, induce a small but measurable pressure drop on the liquid being expelled. This side fitting is threaded or otherwise connected to a small elbow 80 which in turn is suitably connected to the corresponding end portion of the discharge means 46. The discharge means 46 is preferably removably connected to the elbow 80 as by a friction connection between the tubing and a neck of the elbow. The innermost position of the piston 72 should be such that it does not block the small passage 79.

In the flow-control means 44 of FIG. 3 the flow is centrally toward the porous mass 70 and laterally therefrom. Alternative arrangements are shown in FIGS. 6, 7 and 8. In FIG. 6 the microflow means 42 is made a part of a separate connecting element 82 connectable between the housing 52 of the valve and the housing 66 of the flow-control means. The housing 66 provides a small passage 83 that may supplement or take the place of the microflow means 42 and serve a similar function.

In the embodiment of FIG. 6 the flow rate of the flow-control means is determined during manufacture, adjustment of flow rate during use being effected by selection of one of a number of pre-calibrated flow-control means for use in the system. The compacted mass of material 70 may be a compressed mass of filamentary material, as before, or may be a compressed mass of discrete particles that have been compressed together with such force as to reduce the pores between adjoining particles to the desired flow-restricting size. The discrete particles may be spheres of metal or plastic inert to the liquid and the compaction pressure and temperatures employed in the manufacture of the device may be such as to induce bonding between the masses. To prevent any possible release of the compaction pressure between manufacture and use the porous mass 70, particularly if formed of filamentary material or incompletely bonded particles, may be confined between perforated discs 85 held in the housing 74 in fixed spacial relation. With the type of flow-control means shown in FIG. 6 the flow from the bladder member 20 to the discharge means 46 may continue in the same straight line, the flow being from end to end of the mass 70 and the elbow 80 being replaced by an in-line fitting 86.

FIG. 7 shows an adjustable flow-control means differing from that shown in FIG. 3 primarily in the flow path therethrough. Here the flow is parallel to any discs of filamentary material used to form the porous mass 70. The intake space 78 and the passage 79 may then be in alignment and the piston 72 will exert a compressive force that is in a direction transverse to the axis of 78, 79.

FIG. 8 illustrates an alternative arrangement in which the compression of the porous mass 70 can be adjusted before the flow-control means is connected to the multiway valve 40. Here the housing 66 of the flow-control means provides the chamber 67 near its discharge end. Compression of the porous mass 70 is effected by a piston 90 aligned with the body 66 and adjustably threaded into a portion thereof. The liquid flow is from end to end of the porous mass 70 with the influent liquid being delivered through a passage 91 of the piston 90. The passage 91 may be small, if desired, to act as a microflow means. The head of the piston is slotted for reception of a blade and opens on an intake space 93. The head may be indexed or preset to provide the desired flow rate before attachment of the flow-control means 44 to the valve 40.

In the preferred practice of the invention the liquid is expelled from the bladder member 20 solely by pressure thereon induced by the internal stresses of the distended bladder member, the expulsion pressure remaining substantially constant throughout an operating or collapse range of the bladder member. This can be accomplished by proper design of the bladder member and by maintaining the pressure in the internal space 16 of the outer shell 15 at constant or atmospheric pressure. Serving in this latter capacity is a vent opening 95 of the outer shell 15, see FIG. 2. During filling of the bladder member and corresponding distension thereof, air is expelled through the vent opening 95. During liquid-expelling collapse or contraction of the bladder member air will enter the internal space 16 through the vent opening to maintain this space at atmospheric pressure. The outer shell 15 is preferably made of rigid material to prevent any external pressure being applied to the bladder member manually, by contact with clothing or through body movement of the patient in the vicinity of the position of the bladder member.

Alternatively, however, the inflow of air through the vent opening 95 during collapse of the bladder member 20 may be restricted so that the bladder member expulsion pressure is a function both of, first, the internal stresses therein because of distension and, second, a subatmospheric pressure in the internal chamber 16. The vent opening 95 can then act as a flow-control means either alone or in conjunction with a separate flow-control means of the type herein described. This species of the invention is claimed and disclosed more fully in my copending application Ser. No. 521,208, filed Jan. 17, 1966.

Figures 9, 10, 11:
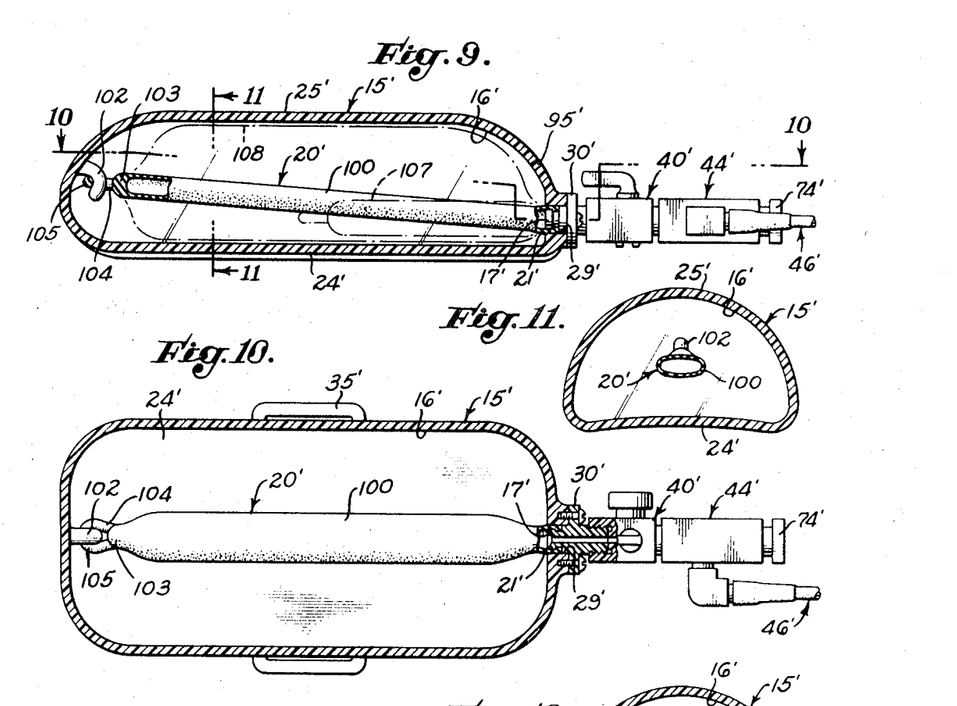

Elongated embodiments of the invention are disclosed in FIGS. 9–12. In FIGS. 9–11 are shown an embodiment in which the outer shell 15' comprises a crested upper wall 25' and a lower wall 24' that may be slightly concave as suggested in FIG. 11. The attachment member 30' may be as previously described, as can be also the hollow neck 17' and the vent opening 95'. The pressure-distendable bladder member 20' is here former as a closed-ended tube 100 of highly elastic material tensioned between the hollow neck 17' and a connection means of the outer shell 15' at the opposed end of the latter. This connection means in FIGS. 9 and 10 is exemplified as comprising a hook 102 adhered to or formed integrally with the outer shell 15'. The tube 100 has a closed end portion 103 carrying a tension element 104 that may terminate in a ring 105 or other connection that can be held by the hook 102.

In this form of the invention the preliminary shape of the tube-like bladder member 20' will be shorter and substantially larger in diameter than when in the tensioned position shown in FIG. 9, such preliminary shape being suggested by the dotted lines 107. The bladder member in such shape is connected to the attachment member 30' and forced through the circular passage 29' of the outer shell. A blunt rod is then placed inside the bladder member with its end pressed against the closed end portion 103 to elongate the bladder member sufficient to hook the ring 105 back of the hook 102. The rod is then withdrawn before attaching the valve 40' and the flow-control means 44'. Maintaining a tube-like bladder member under tension during distension-producing filling and contractive expulsion serves both to maintain a constant pressure on the liquid during the expulsion and to prevent localized bulging of the bladder member upon filling. Of even greater importance however is the fact that the tensioned tube has a smaller internal size than when not tensioned and returns to this small size in contracting from distended position, thus minimizing the residual amount of medicament present when the tube is in its collapsed shape.

The outer shell 15' is made sufficiently strong to withstand the reaction force induced thereon by the tensioning of the bladder member 20'. When distended, the bladder member 20' may substantially fill the internal chamber 16' and occupy a position suggested by the dotted line 108. The bladder member 20' may be a simple rubber tube, lined if desired as previously explained, with one end suitably closed and connected to the tension means 104, in which event its cross-section will be circular both initially and when elongated. Alternatively the bladder member 20' may have an oval cross-section initially and when tensioned, as suggested in FIGS. 9–11. This arrangement permits the bladder member 20' to be expanded more uniformly into shape of the semicircular cross-section of the outer shell 15' illustrated. Other features of this embodiment of the invention and the embodiment of FIGS. 12 and 12a may be as previously described concerning FIGS. 1–8 including the use of index markings on the outer shell.

The embodiment of FIGS. 12 and 12a differs in the tensioning means for the bladder member 20' and in the position of the vent 95'. The latter may be in the end of the elongated outer shell 15' between bifurcations 110 and 111 thereof. The bottom wall 24' here provides a slot 113 for passage of the bladder member 20' from an initial position, suggested by the dotted lines 114, to a tensioned position, shown in full lines. The free end of the bladder member 20' provides a tension element 115 terminating in a spherical head 116. The bladder member 20' can be longitudinally tensioned, moved upward in the slot 113 and locked in position by lifting the tension member 115 between the bifurcations 110 and 111 and releasing it. Upon release, the spherical head 116 will seat rearwardly against the bifurcations, preferably in an indented space 117 of the outer shell provided by the shape of the bifurcations shown.

It has been found that the balloon-type bladder member of FIGS. 1–4 or the constantly-tensioned bladder member of FIGS. 9–12 produces a much more constant expulsion pressure over a usable collapse range thereof than is true with a cylindrical bladder member with its closed end free to move within the outer shell during contraction of the member. With such a balloon-type or constantly-tensioned bladder member a pressure-time curve slopes much less over the usable collapse range than with such a cylindrical bladder member. This is distinctively advantageous in maintaining the expulsion pressure subtantially constant during expulsion of the liquid, e.g. during infusion thereof into the body.

All embodiments of the invention may provide the outer shell and the bladder member as a single-use throw-away unit. The valve 40 or 40' can likewise be of this type with its housing molded integrally with the outer shell. The same is true of the flow-control means but it is usually preferable to provide for detachably connecting it to the valve or otherwise to the bladder member. It is desirable however to provide a flow-control means that can be standardized and filled as a single-use device, thus avoiding any possibility of intermingling a medicament with residual amounts of an earlier-used medicament.

All embodiments of the invention provide for elimination of air from the system before starting injections into the patient. During loading or distension of the bladder member 20 some air may remain therein. This can be bled from the flow-control means or the discharge means by holding the system upright and turning the valve 40 to its discharge position to flush the air from the bladder member and from the passages of the valve and any connected devices, the flushing being continued until liquid is expelled from the end portion of the system. If the bladder member 20 has been significantly reduced in volume during this bleeding it can be further distended by shifting the valve 40 to the charging position and forcing more of the liquid or medicament thereinto from the syringe or other pressure source, all without introducing further air into the system.

Various changes and modifications can be made without departing from the spirit of the invention as defined in the appended claims.

I claim:

1. A device for expelling a liquid at an extremely slow rate over a large number of hours, said device including in combination:

a pressure-distendable bladder member formed of highly elastic material, said bladder member having a single opening providing access to and from the interior thereof, said bladder member being of an initial small size but being severly distendable by liquid introduced thereinto under pressure to establish internal tension stresses therein;

means for expelling liquid from the interior of said severly-distended bladder member solely by pressure on the liquid induced by the internal stresses of the internal stresses of the distended bladder member, said pressure on said liquid remaining substantially constant throughout a collapse range of said bladder member, said means including means surrounding said bladder member maintaining the exterior thereof at atmospheric pressure and preventing contact therewith by any pressure source other than atmospheric air, said last-named means including an outer shell of substantially rigid material surrounding said bladder member and connected thereto adjacent said opening thereof, said outer shell providing an internal space openly vented to the atmosphere and containing said bladder member;

a discharge means having an inlet end portion receiving said liquid from said bladder member and a discharge end portion adapted to expel said liquid at said extremely slow rate; and a flow-control means spaced from said bladder member and located between said opening and said discharge end portion of said discharge means in the path of liquid flow therebetween, said flow-control means including means for severely restricting said flow of said liquid to continue the expulsion thereof from said discharge end portion at an extremely slow rate as said distended bladder member progressively collapses through its collapse range, said expulsion being the result of such progressive collapse, said restricing means including a compressible porous mass of material comprising a locally compressed mass of filamentary material within a chamber in said flow path and means for initially locally compressing the material of said porous mass in said chamber preparatory to said flow and for maintaining said material under compression during such flow, all to reduce the pores of said mass to minute size sufficiently small to restrict the rate of flow and the collapse of said bladder member to prolong both for a period of at least four hours.

2. A device for expelling a liquid at an extremely slow rate over a large number of hours, said device including in combination:

a pressure-distendable bladder member formed of highly elastic material, said bladder member having a single opening providing access to and from the interior thereof, said bladder member being of an initial small size but being severly distendable by liquid introduced thereinto under pressure to establish internal tension stresses therein;

means for expelling liquid from the interior of said severely-distended bladder member solely by pressure on the liquid induced by the internal stresses of the distended bladder member, said pressure on said liquid remaining substantially constant throughout a collapse range of said bladder member;

said means including means surrounding said bladder member maintaining the exterior thereof at atmospheric pressure and preventing contact therewith by any pressure source other than atmospheric air, said last-named means including an outer shell of substantially rigid material surrounding said bladder member and connected thereto adjacent said opening thereof, said outer shell providing an internal space openly vented to the atmosphere and containing said bladder member;

a discharge means having an inlet end portion receiving said liquid from said bladder member and a discharge end portion adapted to expel said liquid at said extremely slow rate; and a flow-control means spaced from said bladder member and located between said opening and said discharge end portion of said discharge means in the path of liquid flow therebetween, said flow-control means including means for severly restricting said flow of said liquid to continue the expulsion thereof from said discharge end portion at an extremely slow rate as said distended bladder member progressively collapses through its collapse range, said expulsion being the result of such progressive collapse, said restricting means including a compressible porous mass of material comprising a locally compressed mass of filamentary material composed of one or more elements each composed of interwoven filaments within a chamber in said flow path and means for initially locally compressing the material of said porous mass in said chamber preparatory to said flow and for maintaining said material under compression during such flow, all to reduce the pores of said mass to minute size sufficiently small to restrict the rate of flow and the collapse of said bladder member to prolong both for a period of at least four hours.

3. A device for expelling a liquid at an extremely slow rate over a large number of hours, said device including in combination:

a pressure-distendable bladder member formed of highly elastic material, said bladder member having a single opening providing access to and from the interior thereof, said bladder member being of an initial small size but being severely distendable by liquid introduced thereinto under pressure to establish internal tension stresses therein;

means for expelling liquid from the interior of said severely-distended bladder member solely by pressure on the liquid induced by the internal stresses of the distended bladder member, said pressure on said liquid remaining substantially constant throughout a collapse range of said bladder member, said means including means surrounding said bladder member maintaining the exterior thereof at atmospheric pressure and preventing contact therewith by any pressure source other than atmospheric air, said last-named means including an outer shell of substantially rigid material surrounding said bladder member and connected thereto adjacent said opening thereof, said outer shell providing an internal space openly vented to the atmosphere and containing said bladder member;

a discharge means having an inlet end portion receiving said liquid from said bladder member and a discharge end portion adapted to expel said liquid at said extremely slow rate;

a flow-control means spaced from said bladder member and located between said opening and said discharge end portion of said discharge means in the path of liquid flow therebetween, said flow-control means including means for severely restricting said flow of said liquid to continue the expulsion thereof from said discharge end portion at an extremely slow rate for a large number of hours as said distended bladder member progressively collapses through its collapse range, said expulsion being the result of such progressive collapse; and a safety means including a microflow means comprising at least one minute passage of sufficiently small size to create a small but measurable pressure drop on said liquid flowing at said extremely slow flow rate, and means for mounting said microflow means in said flow path.

4. A device for expelling a liquid at an extremely slow rate over a large number of hours, said device including in combination:

an outer shell providing an internal space therewithin openly vented to the atmosphere;

a pressure-distendable bladder member within said outer shell formed of highly elastic material, said bladder member having a single opening providing access to and from the interior thereof, said bladder member being of an initial size much smaller than the interior of said shell but being severely distendable within said internal space of said shell by liquid introduced into the bladder member under pressure through said opening, such liquid being later expelled through said opening solely by pressure on the liquid induced by the internal stresses of the distended bladder member, said pressure on said liquid remaining substantially constant throughout a collapse range of said bladder member;

a discharge means having an inlet end portion adapted to receive said liquid and a discharge end portion adapted to expel said liquid at said extremely slow rate;

a multi-way valve between said inlet end portion and said opening of said bladder member, said valve having an inlet means adapted for connection to a source of said liquid under pressure, said valve having passage means interconnecting said inlet means and said opening of said bladder member when said valve is in a first position and interconnecting said opening of said bladder member and said inlet end portion of said discharge means when said valve is in a second position; and a flow-control means between said valve and said discharge end portion of said discharge means in the path of liquid flow therebetween, said flow-control means severely restricting said flow of said liquid to continue the expulsion of said liquid from said discharge end portion for a large number of hours as said distended bladder member progressively collapses in its collapse range, said expulsion being the result of such progressive collapse.

5. A device for expelling a liquid at an extremely slow rate over a large number of hours, said device including in combination:

an outer shell providing an internal space therewithin, there being a hollow neck opening on such space at one position and a connection means within such space at an opposed position;

a pressure-distendable bladder member within said outer shell formed of highly elastic material having at one position a hollow attachment portion secured to said neck and at an opposed position a tension element, said bladder member being of an initial dimension between its hollow attachment portion and its tension element less than the distance between said hollow neck and said connection means;

means for tensioning said bladder member in said outer shell when in initial undistended form, said tension means including means for interconnecting said tension element and said connection means to impose such tension on said bladder member;

means for introducing liquid into said bladder member under sufficient pressure to distend same while tensioned by said tension means;

a discharge means having an inlet end portion receiving liquid from said bladder member through said hollow neck, said discharge means having a discharge end portion adapted to expel said liquid at said slow rate; and flow-control means between said hollow neck and said discharge end portion in the path of liquid flow therebetween said flow-control means severely restricting said flow of said liquid from said discharge end portion.

6. A device as defined in claim 5 in which said bladder member is a tube of said highly elastic material with one end thereof providing said hollow attachment portion and the other end thereof providing said tension element, said outer shell being elongated in the general direction of said tube and being made of a rigid material of sufficient strength to withstand forces exerted thereon by said tension means.

7. An ambulatory infusion device for the infusion of a liquid into the body with such infusion continuing at a slow rate over a large number of hours, said infusion device including in combination:

a rigid outer shell providing an internal space therewithin and means for maintaining the pressure in said internal space equal to the atmospheric pressure around said shell;

means for attaching said outer shell to a portion of the body near an infusion position in which infusion of the liquid into the body is to take place;

a pressure-distendable bladder member within said outer shell formed of highly elastic material, said bladder member being of an initial size much smaller than the interior of said shell but being severely distendable within said internal space by liquid introduced into the bladder member under pressure, said bladder member having an exit portion through which said liquid is expellable during progressive collapse of said bladder member, there being supply means for introducing said liquid under pressure into said bladder member through said exit portion to distend said bladder member within said internal space to a size to substantially fill such space, thus establishing internal tension stresses in the walls of said bladder member, the volume of the distended bladder member being in the range of about 5–1,000 ml., the shape and wall thickness of said bladder member being such as to impose on the liquid being expelled and as a result of said internal tension stresses a substantially constant pressure in the range of about 160–300 mm. of mercury during the progressive collapse of said bladder member;

an infusion means connected to said exit portion having an infusion end portion adapted for infusion of the liquid into the body at said infusion position as said bladder member collapses; and means for limiting the rate of flow of said liquid in said infusion means to a rate of about .1 ml./hr. to about 250 ml./hr. to continue said infusion of the liquid into the body for a period ranging between four hours and several days, said last-named means including a flow-control means spaced from said bladder member and in the flow path of the liquid, said flow-control means being located at a position between said exit portion and said infusion end portion.

8. An ambulatory infusion device as defined in claim 7 in which said flow-control means includes a compressible porous mass of material within a chamber in said flow path, said porous mass being compressible to change its pore size, and including means for compressing said mass in said chamber in various degree to adjust the flow of said liquid to said infusion end portion of said infusion means.

9. An ambulatory infusion device as defined in claim 7 including a microflow means comprising at least one minute passage, and means for mounting said microflow means between said bladder member and said flow-control means.

10. An ambulatory infusion device as defined in claim 7 including a microflow means between said bladder member and said infusion end portion of said infusion means comprising at least one small passage preventing reverse flow of blood from the body toward said bladder member.

11. An ambulatory infusion device as defined in claim 7 including a multi-way valve between said exit portion and said infusion means, said valve including a housing having first and second housing passages respectively communicating with the interior of said bladder member and said infusion means, said housing having a third housing passage comprising a side passage, said side passage including means for detachably connecting same to said supply means, said valve including a movable valve member within said housing having passage means interconnecting said first housing passage and said side passage when said movable valve member is in one position to deliver said liquid under pressure to the interior of said bladder member if said supply means is connected to said side passage and to deliver liquid from the bladder member to and from said side passage if said supply means is disconnected therefrom, said valve member being movable to a second position with its passage means interconnecting said first and second housing passages to supply to said infusion means the liquid inside the distended bladder member pressured by the internal stresses therein.

12. An ambulatory infusion device as defined in claim 11 in which said means for supplying liquid under pressure is a sterile pressure source, and in which said detachably connecting means includes means for detachably connecting said sterile pressure source to said housing of said valve in communication with said side passage.

13. An ambulatory infusion device as defined in claim 11 in which said first and second housing passages are respectively in first and second portions of said housing, and including means for detachably connecting said first portion to said exit portion of said bladder member and means for detachably connecting said second portion to said infusion means.

14. An ambulatory infusion device as defined in claim 7 in which said outer shell provides a lower wall adapted to engage the body and a crested upper wall connected at its lower portions to said lower wall.

15. An ambulatory infusion device as defined in claim 14 in which said lower wall is a downwardly-concave wall conforming to the curve of the body.

16. An ambulatory infusion device as defined in claim 14 in which said crested upper wall is substantially hemispherical in shape.

17. An ambulatory infusion device as defined in claim 14 in which said crested upper wall is formed of transparent material, and including index means on said upper wall conforming to the contour of said bladder member when partially distended.

18. An ambulatory infusion device as defined in claim 7 in which said outer shell is closed from the atmosphere except for a small vent means therethrough openly venting said internal space to the atmosphere to maintain the space between said bladder member and said outer shell at atmospheric pressure during distension and contraction of said bladder member.

19. A device for expelling a liquid at an extremely slow rate over a large number of hours, said device including in combination:

a pressure-distendable bladder member formed of highly elastic material, said bladder member having a single opening providing access to and from the interior thereof, said bladder member being of an initial small size but being severely distendable by liquid introduced thereinto under pressure to establish internal tension stresses therein;

means for expelling liquid from the interior of said severly-distended bladder member solely by pressure on the liquid induced by the internal stresses of the distended bladder member, said pressure on said liquid remaining substantially constant throughout a collapse range of said bladder member, said means including means surrounding said bladder member maintaining the exterior thereof at atmospheric pressure and preventing contact therewith by any pressure source other than atmospheric air, said last-named means including an outer shell of substantially rigid material surrounding said bladder member and connected thereto adjacent said opening thereof, said outer shell providing an internal space openly vented to the atmosphere and containing said bladder member;

a discharge means having an inlet end portion receiving said liquid from said bladder member and a discharge end portion adapted to expel said liquid at said extremely slow rate; and a flow-control means spaced from said bladder member and located between said opening and said discharge end portion of said discharge means in the path of liquid flow therebetween, said flow-control means including means for severely restricting said flow of said liquid to continue the expulsion thereof from said discharge end portion at an extremely slow rate as said distended bladder member progressively collapses through its collapse range, said expulsion being the result of such progressive collapse, said restricting means including a compressible porous mass of material within a chamber in said flow path and means for initially locally compressing the material of said porous mass in said chamber preparatory to said flow and for maintaining said material under compression during such flow, all to reduce the pores of said mass to minute size sufficiently small to restrict the rate of flow and the collapse of said bladder member to prolong both for a period of at least four hours.

20. A device for expelling a liquid at an extremely slow rate over a large number of hours, said device including in combination:

a pressure-distendable bladder member formed of highly elastic material, said bladder member having a single opening providing access to and from the interior thereof, said bladder member being of an initial small size but being severely distendable by liquid introduced thereinto under pressure to establish internal tension stresses therein;

means for expelling liquid from the interior of said severely-distended bladder member solely by pressure on the liquid induced by the internal stresses of the distended bladder member, said pressure on said liquid remaining substantially constant throughout a collapse range of said bladder member, said means including means surrounding said bladder member maintaining the exterior thereof at atmospheric pressure and preventing contact therewith by any pressure source other than atmospheric air, said last-named means including an outer shell of substantially rigid material surrounding said bladder member and connected thereto adjacent said opening thereof, said outer shell providing an internal space openly vented to the atmosphere and containing said bladder member;

a discharge means having an inlet end portion receiving said liquid from said bladder member and a discharge end portion adapted to expel said liquid at said extremely slow rate; and a flow-control means spaced from said bladder member and located between said opening and said discharge end portion of said discharge means in the path of liquid flow therebetween, said flow-control means including means for severely restricting said flow of said liquid to continue the expulsion thereof from said discharge end portion at an extremely slow rate as said distended bladder member progressively collapses through its collapse range, said expulsion being the result of such progressive collapse, said restricting means including a compressible porous mass of material within a chamber in said flow path, said porous mass comprising compressed elements made of plastic inert to said liquid and capable of withstanding autoclaving temperature for sterlization, and means for initially locally compressing the material of said porous mass in said chamber preparatory to said flow and for maintaining said material under compression during such flow, all to reduce the pores of said mass to minute size sufficiently small to restrict the rate of flow and the collapse of said bladder member to prolong both for a period of at least four hours.

References Cited

UNITED STATES PATENTS

| 2,506,035 | 5/1950 | Parker | 401—143 |
|---|---|---|---|
| 2,816,690 | 12/1957 | Lari | 222—92 |
| 2,882,543 | 4/1959 | Rivero | 401—143 |
| 2,261,213 | 11/1941 | Bierman | 128—214 |
| 2,361,818 | 10/1944 | Brightwell | 222—457 X |
| 2,855,933 | 10/1958 | Erikson | 128—272 |
| 2,876,768 | 3/1959 | Schultz | 128—214 |
| 2,966,282 | 12/1960 | Geisler | 222—95 |
| 3,032,037 | 5/1962 | Huber | 128—214.2 |
| 3,048,171 | 8/1962 | Grau | 128—214.2 |

FOREIGN PATENTS 489,110  12/1952  Canada.

DALTON L. TRULUCK, Primary Examiner

U.S. Cl. X.R.

288—216, 232; 222—95, 215